US008217926B2

(12) United States Patent
Meng

(10) Patent No.: US 8,217,926 B2
(45) Date of Patent: Jul. 10, 2012

(54) LIQUID CRYSTAL DISPLAY HAVING COMPENSATION CIRCUIT FOR REDUCING GATE DELAY

(75) Inventor: Kai Meng, Shenzhen (CN)

(73) Assignees: Innocom Technology (Shenzhen) Co., Ltd., Shenzhen, Guangdong Province (CN); Chimei Innolux Corporation, Chu-Nan, Miao-Li County (TW)

( * ) Notice: Subject to any disclaimer, the term of this patent is extended or adjusted under 35 U.S.C. 154(b) by 939 days.

(21) Appl. No.: 12/287,933

(22) Filed: Oct. 14, 2008

(65) Prior Publication Data

US 2009/0096735 A1 Apr. 16, 2009

(30) Foreign Application Priority Data

Oct. 12, 2007 (CN) .......................... 2007 1 0123922

(51) Int. Cl.
*G06F 3/038* (2006.01)
*G09G 5/00* (2006.01)

(52) U.S. Cl. ............. 345/205; 345/214; 345/87; 349/41

(58) Field of Classification Search .......... 345/214–215, 345/204–213
See application file for complete search history.

(56) References Cited

U.S. PATENT DOCUMENTS 5,122,792 A * 6/1992 Stewart ......................... 345/692
5,602,560 A * 2/1997 Ikeda ............................ 345/94
6,100,865 A * 8/2000 Sasaki ............................ 345/92
6,124,840 A * 9/2000 Kwon ............................ 345/100
6,229,510 B1 * 5/2001 Kim et al. ........................ 345/87
6,545,652 B1 * 4/2003 Tsuji .............................. 345/82
6,587,089 B1 * 7/2003 Nakajima ........................ 345/99
6,850,289 B2 * 2/2005 Lee ................................ 349/42
6,862,013 B2 * 3/2005 Takeuchi et al. ................ 345/92
7,106,281 B2 * 9/2006 Kim et al. ........................ 345/76
7,133,034 B2 * 11/2006 Park et al. ..................... 345/204
7,522,146 B2 * 4/2009 Edo et al. ...................... 345/100
2003/0038760 A1 * 2/2003 Kim et al. ........................ 345/76
2003/0210220 A1 * 11/2003 Hebiguchi .................... 345/100
2004/0100434 A1 * 5/2004 Ahn et al. ........................ 345/93
2008/0018586 A1 * 1/2008 Yang et al. .................... 345/100
2008/0074168 A1 * 3/2008 Meng et al. .................... 327/434
2008/0122875 A1 * 5/2008 Qi ................................ 345/690

* cited by examiner

*Primary Examiner* — Alexander Eisen
*Assistant Examiner* — Sanjiv D Patel
(74) *Attorney, Agent, or Firm* — Muncy, Geissler, Olds & Lowe, PLLC

(57) ABSTRACT

An exemplary liquid crystal display includes a liquid crystal panel, a gate driving circuit, a data driving circuit, and a compensation circuit. The liquid crystal panel includes gate lines and data lines intersecting the gate lines. The compensation circuit includes capacitors corresponding to the gate lines. The gate driving circuit is configured for providing scanning signals to the gate lines in sequence. The data driving circuit is configured for providing gray scale voltages to the data lines. The compensation circuit is configured for compensating the scanning signals.

12 Claims, 3 Drawing Sheets

LIQUID CRYSTAL DISPLAY HAVING COMPENSATION CIRCUIT FOR REDUCING GATE DELAY

CROSS-REFERENCE TO RELATED APPLICATION

This application is related to, and claims the benefit of, a foreign priority application filed in China as Serial No. 200710123922.1 on Oct. 12, 2007. The related application is incorporated herein by reference.

FIELD OF THE INVENTION

The present invention relates to liquid crystal displays (LCDs) having compensation circuits for reducing or even eliminating gate delay.

GENERAL BACKGROUND

With LCDs being applied to more and more fields, one emerging trend has been for LCDs to become larger in size. A large size LCD provides a bigger viewing area and high definition. LCDs employing thin film transistors (TFTs) are called TFT-LCDs. Generally, TFT-LCDs have a problem of gate delay due to the long gate lines therein. This problem is also known as gate delay phenomenon of scanning signals. Gate delay typically results in image flickering or other malfunction or poor performance. In a large size LCD with very long gate lines, gate delay may be a serious problem.

Referring to FIG. 3, a related art LCD 100 includes a gate driving circuit 110, a data driving circuit 120, and a liquid crystal panel 130. The gate driving circuit 110 is configured for providing a plurality of scanning signals to the liquid crystal panel 130, and the data driving circuit 120 is configured for providing a plurality of gray scale voltages to the liquid crystal panel 130.

The liquid crystal panel 130 includes a plurality of gate lines 101 which are parallel to each other, a plurality of data lines 102 which are parallel to each other and intersect the gate lines 101, a plurality of TFTs 103 arranged at crossings of the gate lines 101 and the data lines 102, a plurality of pixel electrodes 104, and a plurality of common electrodes 105 opposite to the pixel electrodes 104. A minimum area bounded by two adjacent gate lines 101 and two adjacent data lines 102 is defined as a pixel area. The gate driving circuit 110 outputs a plurality of scanning signals in sequence to the gate lines 101. The data driving circuit 120 applies a plurality of gray scale voltages to source electrodes of corresponding TFTs 103 when each gate line 101 is scanned.

Referring also to FIG. 4, an equivalent circuit diagram of a pixel area is shown. A gate electrode 1031 of the TFT 103 is connected to the corresponding gate line 101, a source electrode 1032 of the TFT 103 is connected to the corresponding data line 102, and a drain electrode 1033 of the TFT 103 is connected to a corresponding pixel electrode 104. Because the gate line 101 has a certain resistance R itself, and a parasitic capacitance Cgd is generated between the gate electrode 1031 and the drain electrode 1033, thereby forming a so-called resistance-capacitance (RC) delay circuit. In one gate line 101, therefore, many such RC delay circuits are connected in series. The RC delay circuit can delay the scanning signal applied to the gate line 101, and thus the waveform of the scanning signal can be distorted.

Referring also to FIG. 5, this shows two waveforms of a scanning signal waveforms provided at two ends of one gate line 101. One of the ends is adjacent to the gate driving circuit 110, and the other end is far away from the gate driving circuit 110. "Vg1" denotes the waveform of the scanning signal that is at the end adjacent to the gate driving circuit 110, and "Vg2" denotes the waveform of the scanning signal that is at the end far away from the gate driving circuit 110. That is, the waveform "Vg2" represents the distorted waveform of the scanning signal that is delayed by the serial RC delay circuits. "Von" denotes a turn-on voltage of each TFT 103, and "Voff" denotes a turn-off voltage of each TFT 103. Because of the distortions of the waveform of the scanning signal, turning on of a TFT 103 far away from the gate driving circuit 110 is delayed. For example, the turning on may be delayed "t" seconds. That is, an actual on-state period of the TFTs 103 far away from the gate driving circuit 110 is shorter than it is supposed to be.

Because a gray scale voltage will not be applied to the drain electrode of any TFT 103 until the TFT 103 is turned on, the TFTs 103 which are far away from the gate driving circuit 110 lack charging of the gray scale voltage. Thus, the image display in the corresponding pixel area is deteriorated. Commonly, many pixel areas are affected because the corresponding TFTs 103 lack charging of gray scale voltages. In this case, the image of the LCD 100 has flickering.

What is needed, therefore, is a liquid crystal display which can overcome the above-described deficiencies.

SUMMARY

An exemplary liquid crystal display includes a liquid crystal panel, a gate driving circuit, a data driving circuit, and a compensation circuit. The liquid crystal panel includes a plurality of gate lines and a plurality of data lines intersecting with the gate lines. The compensation circuit includes a plurality of capacitors corresponding to the gate lines. The gate driving circuit is configured for providing a plurality of scanning signals to the gate lines in sequence. The data driving circuit is configured for providing a plurality of gray scale voltages to the data lines. The compensation circuit is configured for compensating the scanning signals.

Other novel features and advantages of the liquid crystal display will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
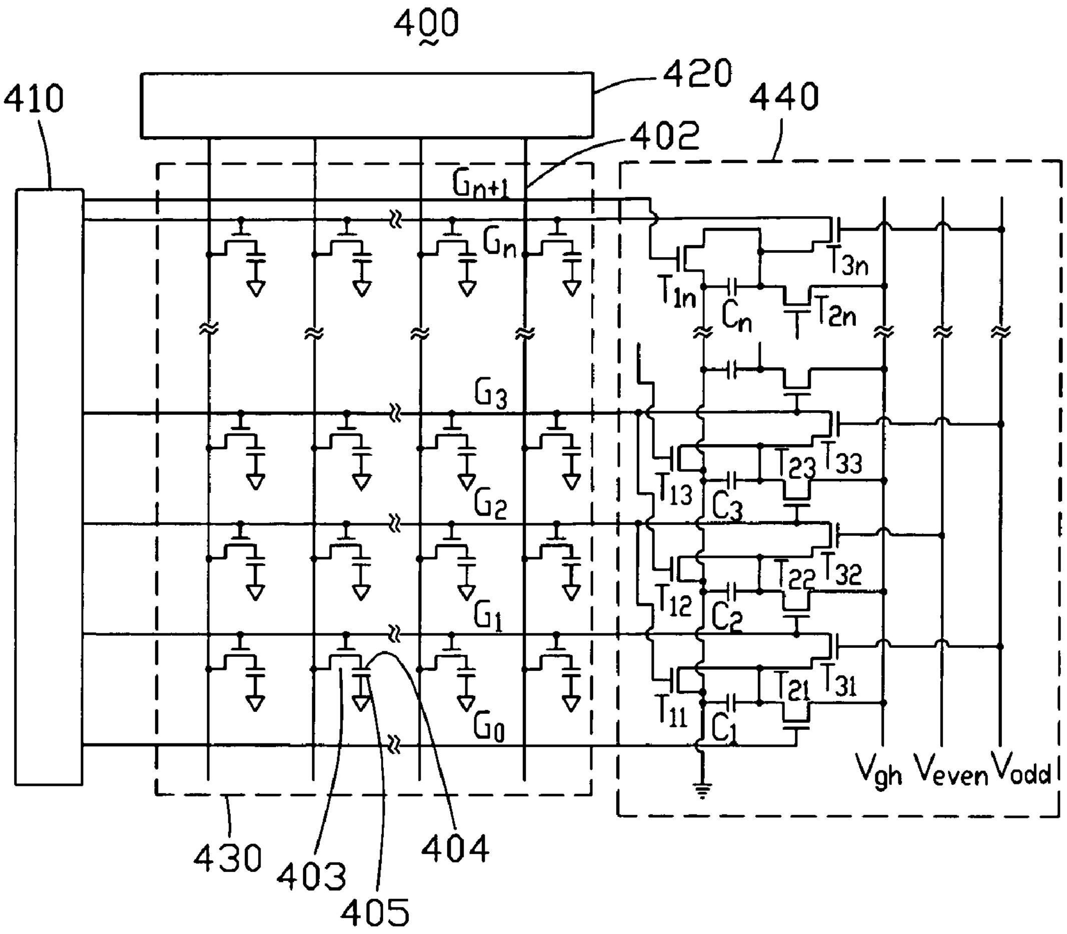
FIG. 1 is an abbreviated circuit diagram of a liquid crystal display according to a first embodiment of the present invention.

Referring to FIG. 1, an abbreviated circuit diagram of a liquid crystal display 400 according to a first embodiment of the present invention is shown. The liquid crystal display 400 includes a gate driving circuit 410, a data driving circuit 420, a liquid crystal panel 430, and a compensation circuit 440. The gate driving circuit 410 is configured for providing a plurality of scanning signals to the liquid crystal panel 430, and the data driving circuit 420 is configured for providing a plurality of gray scale voltages to the liquid crystal panel 430. The compensation circuit 440 is configured for providing a plurality of compensation signals to the liquid crystal panel 430.

The liquid crystal panel 430 includes a plurality of gate lines G1~Gn which are parallel to each other, a plurality of data lines 402 which are parallel to each other and intersect the gate lines G1~Gn, a plurality of TFTs 403 arranged at crossings of the gate lines G1~Gn and the data lines 402, a plurality of pixel electrodes 404, a plurality of common electrodes 405 opposite to the pixel electrodes 404, and a dummy line G0. A minimum area bounded by two adjacent of the gate lines G1~Gn and two adjacent data lines 402 is defined as a pixel area. A free end of each of the gate lines G1~Gn is connected to the gate driving circuit 410, and the other free end of each of the gate lines G1~Gn is connected to the compensation circuit 440. The data lines 402 are connected to the data driving circuit 420.

The TFTs 403 each include a gate electrode (not labeled) connected to the corresponding one of the gate lines G1~Gn, a source electrode (not labeled) connected to the corresponding data line 402, and a drain electrode (not labeled) connected to a corresponding pixel electrode 404. The gate driving circuit 410 outputs a plurality of scanning signals in sequence to the gate lines G1~Gn and the dummy line G0. The data driving circuit 420 applies a plurality of gray scale voltages to source electrodes of corresponding TFTs 403 when one of the gate lines G1~Gn or the dummy line G0 is scanned.

The compensation circuit 440 includes a plurality of capacitors C1~Cn electrically connecting to the gate lines G1~Gn respectively, a voltage input terminal Vgh, a first signal terminal Vodd, a second signal terminal Veven, a plurality of first transistors T11~T1(n−1), a plurality of second transistors T21~T2*n*, and a plurality of third transistors T31~T3*n*. Each of the capacitors C1~Cn includes a function end (not labeled) and a ground end (not labeled).

Gates of the first transistors T11~T1(n−1) are connected to the gate lines G2~Gn respectively (excluding the first gate line G1), sources of the first transistors T11~T1(n−1) are connected to the function ends of the capacitors C1~C(n−1) (excluding the last capacitor Cn), and drains of the first transistors T11~T1(n−1) are connected to the ground ends of the capacitors C1~C(n−1) (excluding the last capacitor Cn). Gates of the second transistors T21~T2*n* are connected to the dummy line G0 and the gate lines G1~Gn, sources of the second transistors T21~T2*n* are connected to the voltage input terminal Vgh, and drains of the second transistors T21~T2*n* are connected to the function ends of the capacitors C1~Cn. Gates of the third transistors T31~T3*n* are connected to the first and second signal terminals Vodd, Veven alternately.

When one of the gate lines G1~Gn (say, "Gm") is being scanned, the correspondingly electrically connected capacitor Cm discharges, the capacitor Cm+1 connected to the gate line Gm+1 to be scanned next is charged, and the capacitor Cm−1 connected to the gate line Gm−1 just previously scanned discharges to ground.

Figure 2:
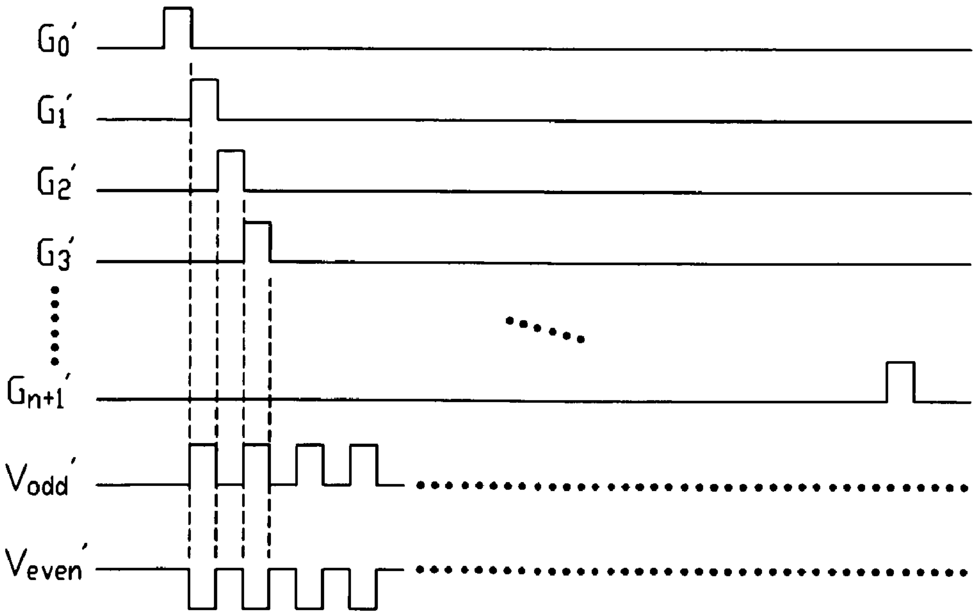
FIG. 2 is an abbreviated diagram of sequential waveforms of driving signals of the liquid crystal display of FIG. 1.
Figure 3:
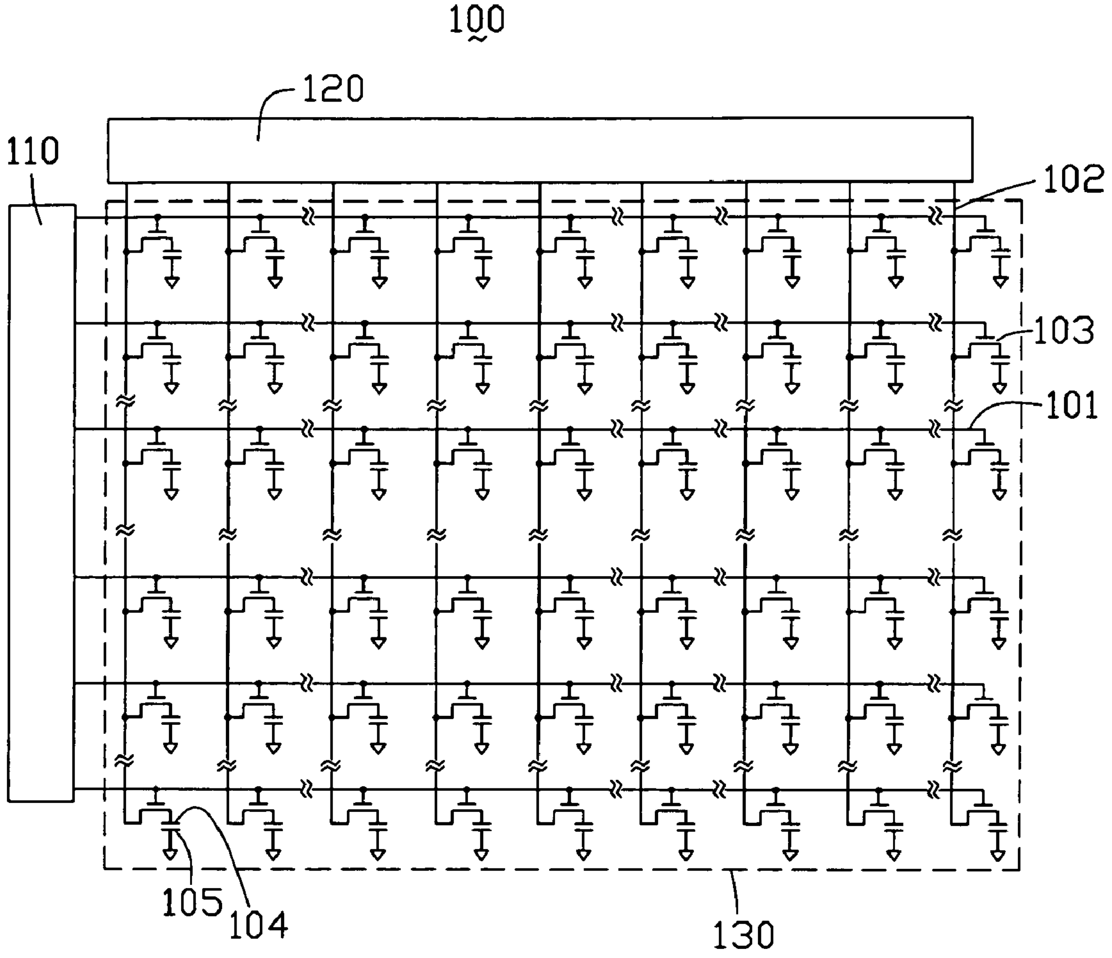
FIG. 3 (RELATED ART)
FIG. 3 is an abbreviated circuit diagram of a conventional liquid crystal display, the liquid crystal display including a liquid crystal panel, the liquid crystal panel including a plurality of pixel areas.
Figure 4:
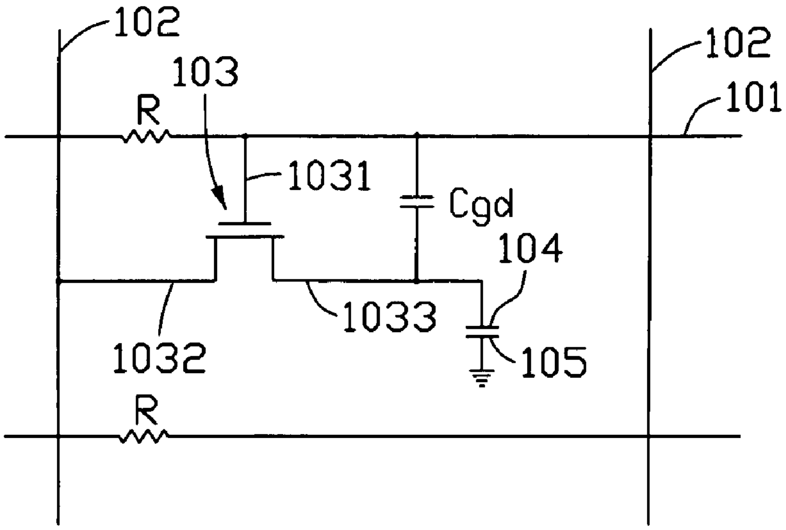
FIG. 4 (RELATED ART)
FIG. 4 is an equivalent circuit diagram of one of the pixel areas of FIG. 3.
Figure 5:
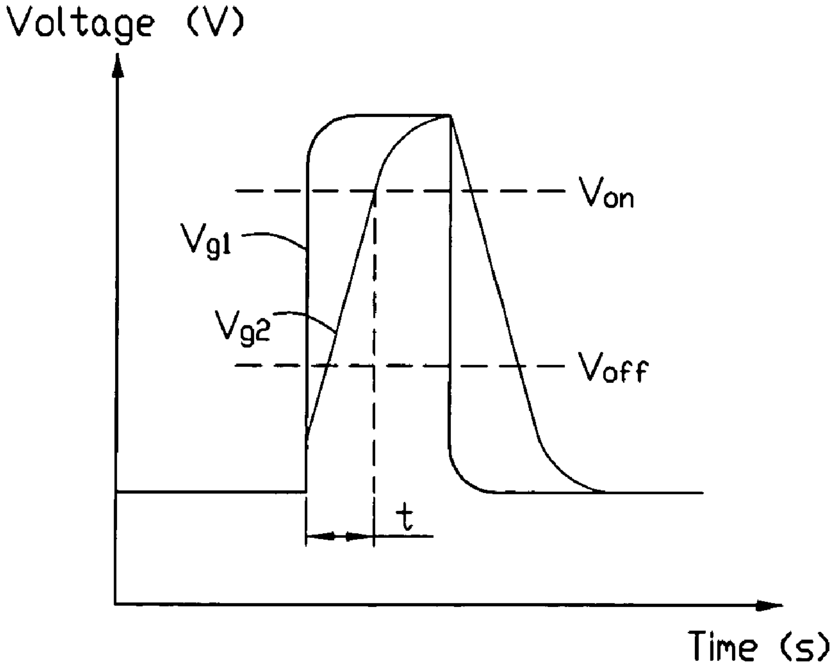
FIG. 5 (RELATED ART)
FIG. 5 is a voltage-time graph relating to the liquid crystal display of FIG. 3, illustrating a gate delay phenomenon.

Referring to FIG. 2, this is an abbreviated diagram of sequential waveforms of driving signals of the liquid crystal display 400. In FIG. 2, G0' and G1'~Gn' represent the scanning signals applied to the dummy line G0 and the gate lines G1~Gn respectively. Vodd', Veven' represent the pulse signals output from the first signal terminal Vodd and the second signal terminal Veven respectively.

When a scanning signal is applied to the dummy line G0, the scanning signal G0' is at high level, the second transistor T21 is switched on. The capacitor C1 is charged by the voltage input terminal Vgh via the on-state second transistor T21.

When the gate line G1 is scanned, the scanning signal G1' is at high level. The second transistor T22 is switched on. The scanning signal G0' is at low level. The pulse signal Vodd' is at high level, and the third transistor T31 is switched on. Thus, the capacitor C1 discharges to charge the scanning signal G1', and the capacitor C2 is charged by the voltage input terminal Vgh via the on-state second transistor T22.

When the gate line G2 is scanned, the scanning signal G2' is at high level. The first transistor T11 and the second transistor T23 are switched on. The scanning signal G1' is at low level. The pulse signal Veven' is at high level, and the third transistor T32 is switched on. Thus, the capacitor C2 discharges to charge the scanning signal G2', and the capacitor C3 is charged by the voltage input terminal Vgh via the on-state second transistor T23. The capacitor C1 discharges via the on-state first transistor T11.

Thereafter, a similar working procedure occurs each time one of the gate lines G3~G(n−1) is being scanned.

Thus when the gate line Gn is being scanned, the scanning signal Gn' is at high level. The pulse signal Vodd' is at high level. The third transistor T3*n* is switched on. The first transistor T1(n−1) is switched on. The capacitor Cn compensates the scanning signal Gn' via the on-state third transistor T3*n* that is far away from the gate driving circuit 410. The capacitor Cn−1 is grounded and discharges via the first transistor T1(n−1).

The liquid crystal display 400 repeats the above-described working procedure during each frame.

In summary, the liquid crystal display 400 includes the compensation circuit 440 and the dummy line G0. The compensation circuit 440 includes the voltage input terminal Vgh, the first signal terminal Vodd, the second signal terminal Veven, the plural first, second, and third transistors T11~T1(n−1), T21~T2*n*, T31~T3*n*, and the plural capacitors C1~Cn. When one of the gate lines G1~Gn (say, "Gm") is being scanned, the correspondingly electrically connected capacitor Cm discharges, the capacitor Cm+1 connected to the gate line Gm+1 to be scanned next is charged, and the capacitor Cm−1 connecting the gate line Gm−1 just previously scanned discharges to ground. Therefore, gate delay in the liquid crystal display 400 can be effectively reduced or even eliminated.

Other alternative embodiments can include the following. In one example, the LCD 400 can include a plurality buffers arranged between the capacitors C1~Cn and the third transistors T31~T3*n*.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of the present invention to the full extent indicated by the broad general meaning of the terms in which the appended claims are expressed.

What is claimed is:

1. A liquid crystal display comprising:

a liquid crystal panel comprising a plurality of gate lines parallel to each other, a plurality of data lines parallel to each other and intersecting the gate lines, and a dummy line parallel to the gate lines and located at one end of the liquid crystal panel;

a gate driving circuit configured for providing a plurality of scanning signals to the gate lines in sequence;

a data driving circuit configured for providing a plurality of gray scale voltages to the data lines; and a compensation circuit comprising a plurality of capacitors electrically connected to the gate lines respectively, and being configured for compensating the scanning signals, wherein when one of the gate lines is being scanned, the correspondingly electrically connected capacitor discharges, the capacitor connected to the gate line to be scanned next is charged, and the capacitor connected to the gate line just previously scanned discharges to ground, wherein each of the capacitors comprises a function end and a ground end, the compensation circuit further comprising a voltage input terminal, a first signal terminal, a second signal terminal, a plurality of first transistors, a plurality of second transistors, and a plurality of third transistors, wherein gates of the first transistors are connected to the gate lines respectively, sources of the first transistors are connected to the function ends of the capacitors, and drains of the first transistors are connected to the ground ends of the capacitors, wherein gates of the second transistors are connected to the dummy line or the gate lines, sources of the second transistors are connected to the voltage input terminal, and drains of the second transistors are connected to the function ends of the capacitors, and wherein gates of the third transistors are connected to the first and second signal terminals alternately, sources of the third transistors are connected to the gate lines, and drains of the third transistors are connected to the function ends of the capacitors.

2. The liquid crystal display in claim 1, wherein the voltage input terminal is connected to a high voltage direct-current power source, and the first and second signal terminals are connected to a pulse generator.

3. The liquid crystal display in claim 2, wherein pulses from each of the first signal terminal and the second signal terminal have a predetermined pulse width, amplitude, and frequency.

4. The liquid crystal display in claim 1, wherein the compensation circuit is disposed at one end of the liquid crystal panel.

5. The liquid crystal display in claim 1, wherein the liquid crystal panel further comprises a plurality of pixel electrodes, and a plurality of thin film transistors disposed at points of intersection of the gate lines and the data lines.

6. The liquid crystal display in claim 5, wherein each thin film transistor comprises a gate connected to a corresponding one of the gate lines, a source connected to a corresponding one of the data lines, and a drain connected to a corresponding one of the pixel electrodes.

7. The liquid crystal display in claim 1, wherein one end of each of the gate lines is connected to the gate driving circuit, and the other end of each of the gate lines is connected to the compensation circuit.

8. The liquid crystal display in claim 1, wherein the compensation circuit further comprises a plurality of buffers disposed between the function ends of the capacitors and the sources of the third transistors.

9. A liquid crystal display comprising:

a liquid crystal panel comprising a plurality of gate lines, a plurality of data lines intersecting the gate lines; and a compensation circuit comprising a plurality of compensating units for compensating scanning signals provided to the gate lines, each of the compensating units comprising a capacitor, a first transistor, a second transistor, a third transistor, a voltage input terminal, a first signal terminal, and a second signal terminal;

wherein a gate of the first transistor is connected to a corresponding gate line, a source and a drain of the first transistor are respectively connected to a function end and a ground end of the capacitor of a corresponding one of the compensating units;

a gate of the second transistor is connected to a next gate line, a source of the second transistor is connected to the voltage input terminal, and a drain of the second transistor is connected to the function end of the capacitor;

a gate of the third transistor is connected to one of the first signal terminal and the second signal terminal, a source of the third transistor is connected to the gate line, and a drain of the third transistor is connected to the function end of the capacitor, wherein each of the third transistors of two compensating units corresponding to two adjacent gate lines is connected to a different one of the first signal terminal and the second signal terminal respectively.

10. The liquid crystal display in claim 9, wherein the voltage input terminal is connected to a high voltage direct-current power source, and each of the first and second signal terminals is connected to a pulse generator.

11. The liquid crystal display in claim 10, wherein pulses from each of the first signal terminal and the second signal terminal have a same pulse width as the scanning signals.

12. The liquid crystal display in claim 11, wherein when the pulse from the first terminal is of a high level voltage, the pulse from the second terminal is of a low level voltage.

* * * * *